(12) United States Patent
Shiraishi

(10) Patent No.: US 11,620,434 B2
(45) Date of Patent: Apr. 4, 2023

(54) INFORMATION PROCESSING APPARATUS, INFORMATION PROCESSING METHOD, AND STORAGE MEDIUM THAT PROVIDE A HIGHLIGHTING FEATURE OF HIGHLIGHTING A DISPLAYED CHARACTER RECOGNITION AREA

(71) Applicant: CANON KABUSHIKI KAISHA, Tokyo (JP)

(72) Inventor: Kenichi Shiraishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/687,847

(22) Filed: Mar. 7, 2022

(65) Prior Publication Data
US 2022/0292251 A1    Sep. 15, 2022

(30) Foreign Application Priority Data
Mar. 9, 2021  (JP) .............................. JP2021-037164

(51) Int. Cl.
| | |
|---|---|
| G06F 40/106 | (2020.01) |
| G06V 30/14 | (2022.01) |
| G06F 3/04842 | (2022.01) |
| G06F 40/166 | (2020.01) |

(Continued)

(52) U.S. Cl.
CPC ........ G06F 40/106 (2020.01); G06F 3/04842 (2013.01); G06F 3/04847 (2013.01); G06F 40/117 (2020.01); G06F 40/166 (2020.01); G06V 30/1448 (2022.01); *G06F 2203/04803* (2013.01)

(58) Field of Classification Search
CPC .............. G06F 40/106; G06F 3/04842; G06F 3/04847; G06F 40/117; G06F 40/166
See application file for complete search history.

(56) References Cited

U.S. PATENT DOCUMENTS

| | | | | |
|---|---|---|---|---|
| 7,965,891 | B2* | 6/2011 | Handley | G06V 30/416 |
| | | | | 382/176 |
| 8,171,394 | B2* | 5/2012 | Taylor | G06F 16/38 |
| | | | | 715/236 |

(Continued)

FOREIGN PATENT DOCUMENTS

JP      2014174923 A      9/2014

*Primary Examiner* — Asher D Kells
(74) *Attorney, Agent, or Firm* — Rossi, Kimms & McDowell LLP

(57) ABSTRACT

Results of character recognition processing for a scanned image of a document and a setting item set to a property attached to the scanned image of a document are obtained. Displaying on a screen having a preview area where the scanned image of a document is displayed and an editing area where information input in the setting item is edited, that is, displaying the scanned image of a document in the preview area and displaying the setting item and the information in the editing area are controlled. A selection for the setting item displayed in the editing area is detected. A verification rule set to the detected setting item is obtained. A character recognition area satisfying the verification rule is extracted from the results of the character recognition processing. A character recognition area displayed on the preview area and extracted is highlighted.

9 Claims, 16 Drawing Sheets

(51) Int. Cl.
 *G06F 40/117* (2020.01)
 *G06F 3/04847* (2022.01)

(56) References Cited

U.S. PATENT DOCUMENTS

| | | | |
|---|---|---|---|
| 8,650,221 B2* | 2/2014 | Dixon | G06F 16/38 |
| | | | 713/176 |
| 9,323,447 B2* | 4/2016 | Vojak | G06F 3/0488 |
| 10,769,357 B1* | 9/2020 | Ho | G06F 40/174 |
| 2004/0044958 A1* | 3/2004 | Wolf | G06F 40/117 |
| | | | 715/255 |
| 2006/0044605 A1* | 3/2006 | Schneider | G06V 30/1448 |
| | | | 358/1.15 |
| 2008/0162603 A1* | 7/2008 | Garg | G06V 30/127 |
| 2009/0019132 A1* | 1/2009 | Kamata | H04N 1/00222 |
| | | | 709/217 |
| 2009/0089315 A1* | 4/2009 | Jeffery | G06F 16/38 |
| | | | 707/999.102 |
| 2010/0067064 A1* | 3/2010 | Shigehisa | H04N 1/40062 |
| | | | 358/403 |
| 2010/0289757 A1* | 11/2010 | Budelli | H04N 1/0035 |
| | | | 345/173 |
| 2012/0240038 A1* | 9/2012 | Curtis | G06F 40/174 |
| | | | 715/256 |
| 2013/0061124 A1* | 3/2013 | Patton | G06F 40/174 |
| | | | 715/224 |
| 2014/0258828 A1* | 9/2014 | Lymer | G06F 40/174 |
| | | | 715/224 |
| 2014/0268246 A1 | 9/2014 | Ohguro | |
| 2014/0359418 A1* | 12/2014 | Balamurugan | G06F 40/174 |
| | | | 715/222 |
| 2015/0213283 A1* | 7/2015 | Ho | G06F 21/6218 |
| | | | 726/28 |
| 2015/0317296 A1* | 11/2015 | Vohra | G06F 16/93 |
| | | | 715/221 |
| 2016/0179313 A1* | 6/2016 | Ho | G06V 10/987 |
| | | | 715/776 |
| 2016/0335494 A1* | 11/2016 | Ho | G06V 30/416 |
| 2019/0065843 A1* | 2/2019 | Matsumoto | G06V 30/1456 |
| 2019/0171875 A1* | 6/2019 | Northrup | G06F 40/163 |
| 2019/0222701 A1* | 7/2019 | Koelewijn | H04N 1/2187 |
| 2019/0230232 A1* | 7/2019 | Soga | H04N 1/00331 |
| 2019/0379797 A1* | 12/2019 | Sahagun | H04N 1/00241 |
| 2020/0336612 A1* | 10/2020 | Inoue | G06F 3/0482 |
| 2020/0336613 A1* | 10/2020 | Shiraishi | G06F 40/174 |
| 2021/0286941 A1* | 9/2021 | Nakagawa | G06V 30/412 |

* cited by examiner

INFORMATION PROCESSING APPARATUS, INFORMATION PROCESSING METHOD, AND STORAGE MEDIUM THAT PROVIDE A HIGHLIGHTING FEATURE OF HIGHLIGHTING A DISPLAYED CHARACTER RECOGNITION AREA

FIELD

The present disclosure relates to a technique for setting a property to a document file.

DESCRIPTION OF THE RELATED ART

Conventionally, there is a system in which a document, such as a paper business form, is scanned and filed and character information is extracted by performing character recognition processing for the scanned image of the document and a character string selected from the obtained character information is set to a property (setting information), such as the file name and metadata of the document.

As the system that performs the processing such as this, there is a system that presents a screen to a user, which has a preview area in which a scanned image of a document is displayed and an editing area in which information that is input in a setting item of a property is displayed/edited.

Further, there is a system that verifies whether an appropriate character string is set to the setting item of the property by providing a verification rule, such as a regular expression, for the setting item of the property. Japanese Patent Laid-Open No. 2014-174923 has disclosed a technique to obtain text data from document image data and verify whether the obtained text data is appropriate based on the regular expression.

The technique of Japanese Patent Laid-Open No. 2014-174923 verifies whether text data designated by the user operation is appropriate. In a document image, a plurality of pieces of text data that can be a designation target exists, and therefore, it is difficult for a user to designate appropriate text data.

The present disclosure has been made in view of the above-described problem and an object is to present a character recognition area that is a designation target to a user in an easy-to-see manner.

SUMMARY OF THE INVENTION

The information processing apparatus according to an aspect of the present disclosure includes a first obtaining unit configured to obtain results of character recognition processing for a scanned image of a document and a setting item that is set to a property that is attached to the scanned image of a document; a display control unit configured to control displaying on a screen having a preview area in which the scanned image of a document is displayed and an editing area in which information that is input in the setting item is edited, that is, displaying the scanned image of a document in the preview area and displaying the setting item and the information in the editing area; a detection unit configured to detect a selection for the setting item displayed in the editing area; a second obtaining unit configured to obtain a verification rule that is set to the setting item detected by the detection unit; and an extraction unit configured to extract a character recognition area that satisfies the verification rule from the results of the character recognition processing, wherein the display control unit highlights a character recognition area that is displayed on the preview area and extracted by the extraction unit.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present disclosure related to the scope of the claims and all combinations of features explained in the present embodiments are not necessarily indispensable to the solution of the present disclosure. By attaching the same reference number to the same component and explanation thereof is omitted.

First Embodiment

<System Configuration>

Figure 1:
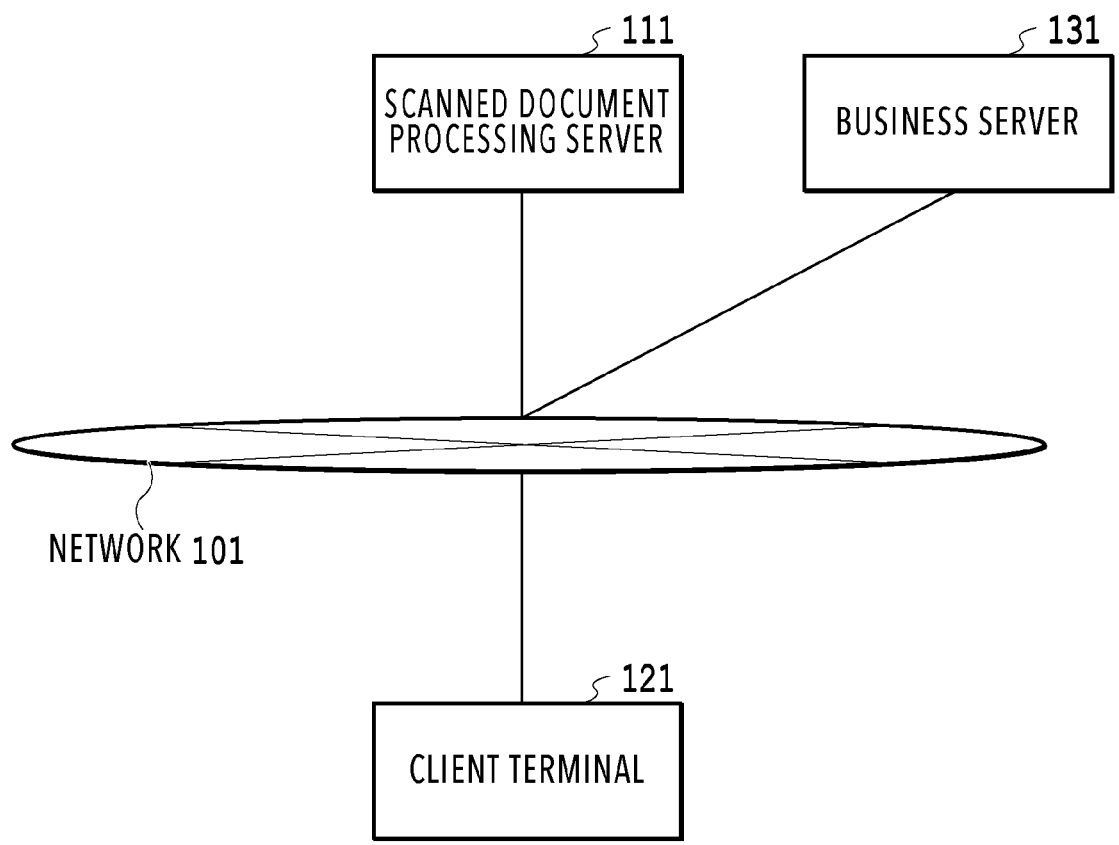
FIG. 1 is a diagram showing a configuration example of a system.

FIG. 1 is a diagram showing a configuration example of a system including an information processing apparatus according to the present embodiment. As shown in FIG. 1, the system of the present embodiment has a scanned document processing server 111, a client terminal 121, and a business server 131 and these are connected by a network 101 so as to be capable of transmitting/receiving data to/from one another.

The scanned document processing server 111 is a server that performs document processing to set a property, such as a file name and metadata, of a scanned image obtained by scanning a document, and so on, and details will be described later. The client terminal 121 may be, for example, a personal computer, a laptop computer, a tablet computer, a smartphone and the like, or another form/type of computer and details will be described later. The business server 131 is a server that performs processing relating to business, such as file management, document management, order reception, and accounting, and details will be described later.

<Hardware Configuration of Information Processing Apparatus>

Figure 2:
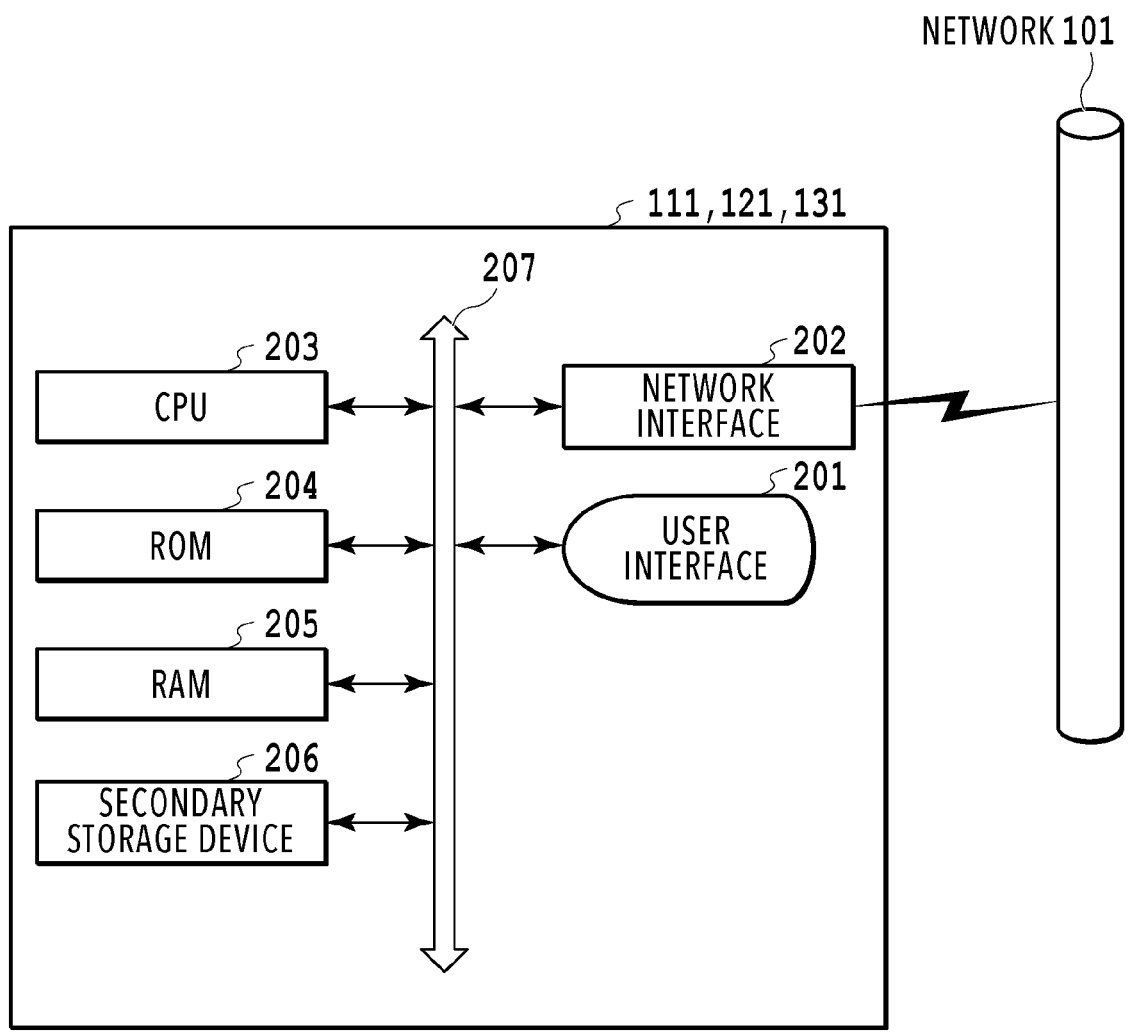
FIG. 2 is a diagram showing a hardware configuration example of an information processing apparatus.

FIG. 2 is a diagram showing a hardware configuration example of the information processing apparatuses of the scanned document processing server 111, the client terminal 121, and the business server 131. The information processing apparatus has a user interface 201, a network interface 202, a CPU 203, a ROM 204, a RAM 205, and a secondary storage device 206 and each unit is connected with one another so as to be capable of transmission and reception of data via an input/output interface 207.

The user interface 201 has a display, a keyboard, a mouse, a button, a touch panel and the like and inputs and outputs information and signals. It is also possible for another computer to connect to and operate a computer not comprising the hardware such as this through a remote desktop, a remote shell and the like.

The network interface 202 connects to a network, such as LAN, and performs communication with another computer and a network device. The communication method may be wired or wireless.

The CPU (Central Processing Unit) 203 reads and executes programs stored in the ROM 204, the RAM 205, the secondary storage device 206 and the like and gives instructions to perform various kinds of control of the information processing apparatus.

The ROM (Read Only Memory) 204 stores incorporated programs, data and the like. The RAM (Random Access Memory) 205 is used as a temporary storage area, such as a main memory and a work area, of the CPU 203. The secondary storage device 206 is a storage that stores programs and for example, it is possible to use an HDD (Hard Disk Drive), a flash memory and the like.

<Software Configuration of Entire System>

Figure 3:
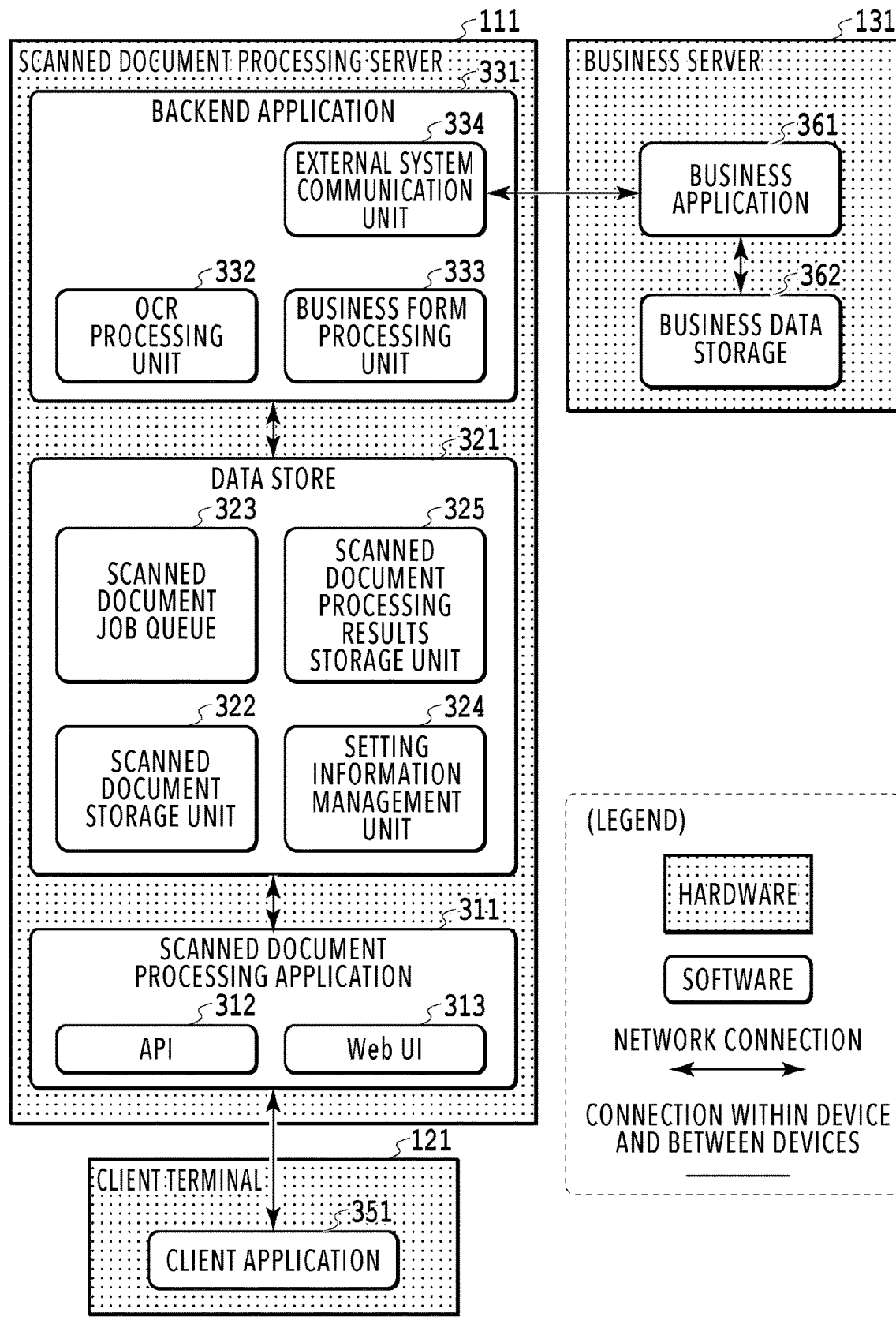
FIG. 3 is a diagram showing a software configuration example of each apparatus of the system.

FIG. 3 is a diagram showing a software configuration example of the system. Each piece of software installed in each piece of hardware is executed by the CPU 203 of the information processing apparatus and configured to be capable of communication with one another as shown schematically by an arrow of network connection.

<Configuration of Scanned Document Processing Server 111>

The scanned document processing server 111 has a scanned document processing application 311, a backend application 331, and a data store 321. In the present embodiment, although explanation is given on the assumption that the scanned document processing server 111 operates as a Web application server, another aspect may be accepted in which another application is mounted.

The scanned document processing application 311 is an application installed in the scanned document processing server 111 and has an API 312 and a Web UI 313. In other words, it can also be said that the API (Application Programming Interface) 312 and the Web UI (User Interface) 313 are provided by the scanned document processing application 311.

The data store 321 is implemented as a storage area within the secondary storage device 206 of the scanned document processing server 111 and has a scanned document storage unit 322, a scanned document job queue 323, a setting information management unit 324, and a scanned document processing results storage unit 325. The data store 321 saves/stores data that is used by the scanned document processing application 311 or the backend application 331, to be described later. Each function unit of the data store 321 stores various kinds of data, to be explained next. The scanned document storage unit 322 saves the file of a scanned document itself as an image file, such as JPEG, or as a document file, such as PDF (Portable Document Format). The scanned document job queue 323 stores a queue that manages jobs waiting for setting information input processing, to be described later. The setting information management unit 324 manages the list of setting items needed to be added to each scanned document, the name of each setting item, the format (character string, numeral and the like) of a value that is set to each setting item, to be described later, and verification rules (detection rules). The scanned document processing results storage unit 325 stores character recognition (OCR (Optical Character Recognition)) processing results and business form determination results. Further, the scanned document processing results storage unit 325 stores OCR area information associated with the setting item for each scanned document, the value of an input setting item, and the like.

The backend application 331 is an application installed in the scanned document processing server 111 and has an OCR processing unit 332, a business form processing unit 333, and an external system communication unit 334.

The backend application 331 is an application for performing background processing. The backend application 331 is in charge of the processing that is performed sequentially on the background as shown below. The OCR processing unit 332 obtains an input image (scanned image) from the scanned document storage unit 322 and performs OCR processing for the obtained input image. In the OCR processing, information on the starting point coordinates, width, and height of an area recognized as a character string is obtained and a character string is extracted, which is recognized results of the OCR processing. The business form processing unit 333 determines the type of business form by using information on the input image, the area pattern of the OCR processing results, the character string of the OCR results and the like. The determination processing may be any method, such as pattern recognition and machine learning.

The external system communication unit 334 performs processing to transmit a scanned document and processing results thereof to the external business server 131. In a case where it is not necessary to transmit a scanned document and processing results thereof to the outside, the external system communication unit 334 can be omitted.

<Configuration of Client Terminal 121>

The client terminal 121 has a client application 351. The client application 351 is an application installed in the client terminal 121. In the present embodiment, the client application 351 executes a Web application of the scanned document processing application 311. As one aspect in which the client application 351 is provided, there is a method in which the Web UI 313 is displayed by a browser and the Web application is executed by transmitting and receiving necessary data via the API 312. Alternatively, the client application 351 may be an application of a computer, a smartphone or the like, which is created so as to transmit and receive necessary data via the API 312.

<Configuration of Business Server 131>

The business server 131 has a business application 361 and a business data storage 362. The business application 361 is an application installed in the business server 131 and executed by the business server 131. The business application 361 may be, for example, a business application for one of file management, document management, order reception, and accounting. In a case where the results of processing by the scanned document processing server 111 are received, business processing is performed for the results, and the results are kept, the business application 361 is necessary. In other cases, the business application 361 can be omitted. The business data storage 362 saves data that is used by the business application 361.

<Configuration Example of UI Screen>

Here, a scene is explained by using diagrams, in which a file name and metadata are set to a document from a character recognition area (OCR area) in a preview page image on a UI screen that is provided in a case where the client application 351 is executed. This UI screen is displayed on a display of the user interface 201 of the client terminal 121 or the like.

Figure 4A:
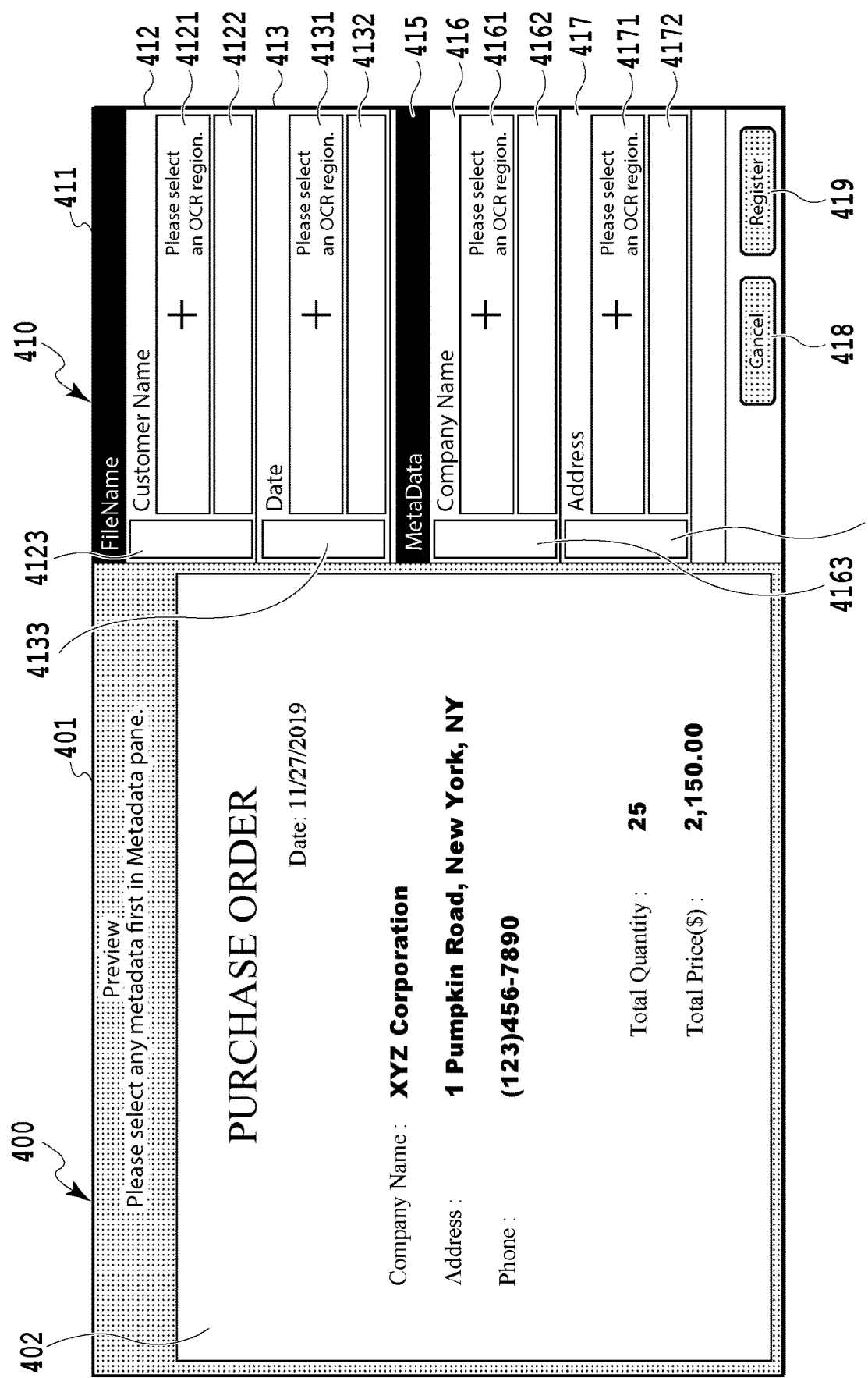
FIG. 4A and FIG. 4B are diagrams showing an example of a UI screen that is provided by a client application.
Figure 4B:

FIG. 4A and FIG. 4B are diagrams showing an example of a UI screen that is provided by the client application 351 and a coordinate system. FIG. 4A shows a scene in which a file name and metadata are set to a document from an OCR area in a preview page image on a UI screen that is provided by the client application 351.

A UI screen 400 has a preview pane 401 and a setting information editing pane 410. The preview pane 401 has a preview area in which a scanned image obtained by scanning a document is displayed as a preview page image 402. The preview pane 401 receives the user operation, such as scroll and zoom, and displays the preview page image 402 in the state in accordance with the contents of the received user operation. The setting information editing pane 410 has an editing area for displaying a list of setting items to be attached to each type of business form, which is the results of determination of a scanned document, and for editing information that is input in the setting item. The setting information editing pane 410 has setting information 411 relating to "FileName" and setting information 415 relating to "MetaData".

In the example in FIG. 4A, the type of business form of the scanned image is determined as "PURCHASE ORDER" and in the setting information editing pane 410, as necessary setting items, items in accordance with the business form determination results are displayed. The setting information 411 relating to "FileName" has, as necessary setting items, a setting item "Customer Name" 412 in which a customer name is set and a setting item "Date" 413 in which a date is set and these are displayed so that editing is possible. Further, the setting information 415 relating to "MetaData" has, as necessary setting items, a setting item "Company Name" 416 in which a company name is set and a setting item "Address" 417 in which the address of the company is set and these are displayed so that editing is possible. The setting items 412, 413, 416, and 417 have display areas 4121, 4131, 4161, and 4171, respectively, input controls 4122, 4132, 4162, and 4172, respectively, and foreground color display portions 4123, 4133, 4163, and 4173, respectively. The display areas 4121, 4131, 4161, and 4171 are each an area in which a cutout image of a selected OCR area is displayed. The input controls 4122, 4132, 4162, and 4172 are each an area for displaying and editing an extracted character string in a selected OCR area. The foreground color display portions 4123, 4133, 4163, and 4173 are each an area in which the color that is attached as a highlighted portion to the foreground of the OCR area is displayed.

FIG. 4B is a diagram explaining an orthogonal coordinate system indicating a relationship between the preview page image 402 and an OCR area. As character recognition results by OCR processing, four OCR areas 421, 422, 423, and 424 exist. The OCR area 421 corresponds to a rectangular area surrounding a character string "PURCHASE ORDER". The OCR area 422 corresponds to a rectangular area surrounding a character string "Nov. 27, 2019". The OCR area 423 corresponds to a rectangular area surrounding a character string "Company Name:". The OCR area 424 corresponds to a rectangular area surrounding a character string "XYZ Corporation". In the preview page image 402, although five or more OCR areas exist, explanation is given by omitting those here. In the OCR area, each of the starting point coordinates, width, and height is identified. For example, the OCR area 421 is represented, in units of pixels, as that the starting point coordinates, which are coordinates of the top left in the OCR area 421, are (1,200, 700), the magnitude of the width (in the x-axis direction) is 720, and the magnitude of the height (in the y-axis direction) is 120.

<UI Screen Example in a Case where OCR Area is Designated>

Figure 5A:
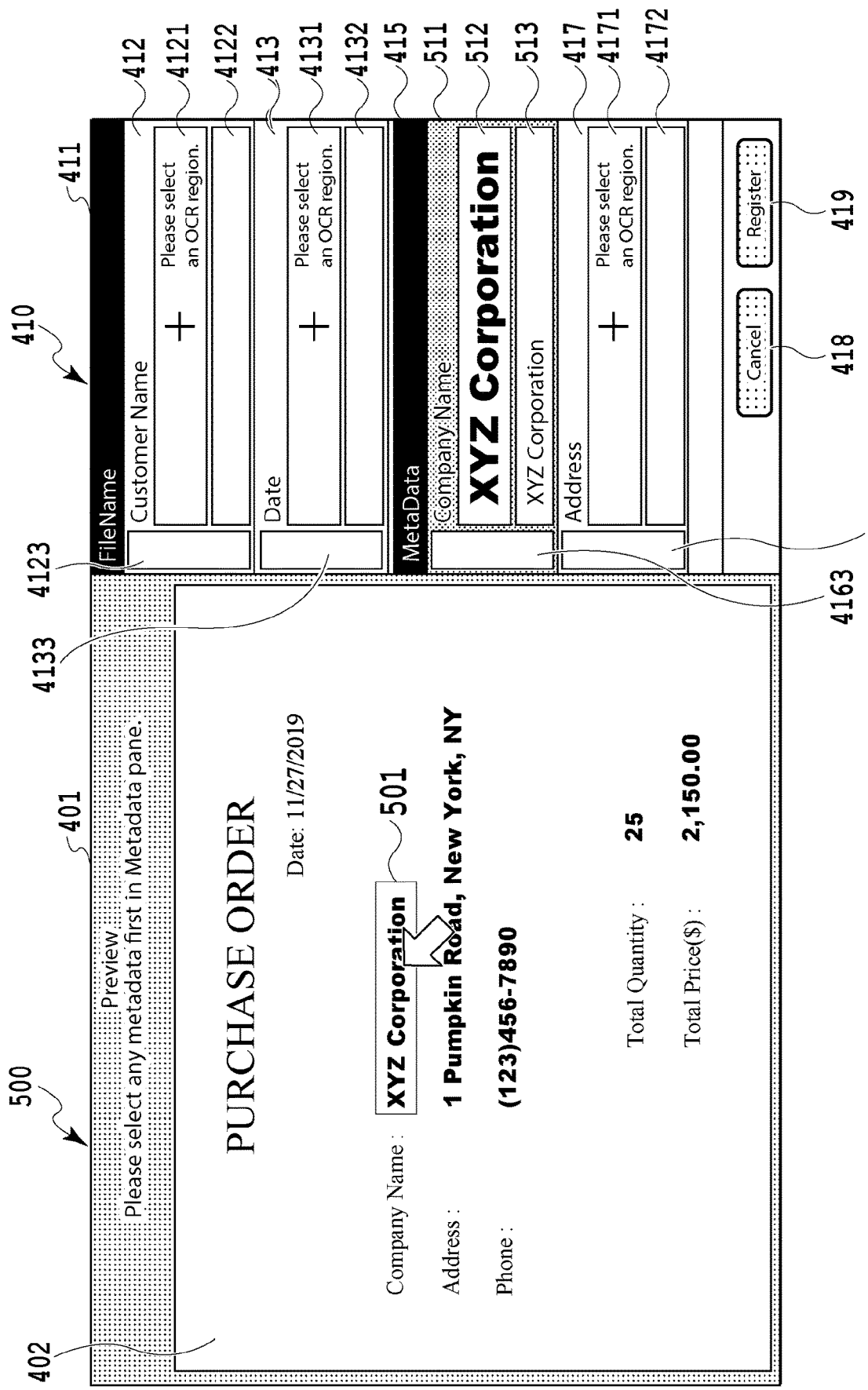
FIG. 5A and FIG. 5B are diagrams showing an example of a UI screen that is provided by the client application.
Figure 5B:
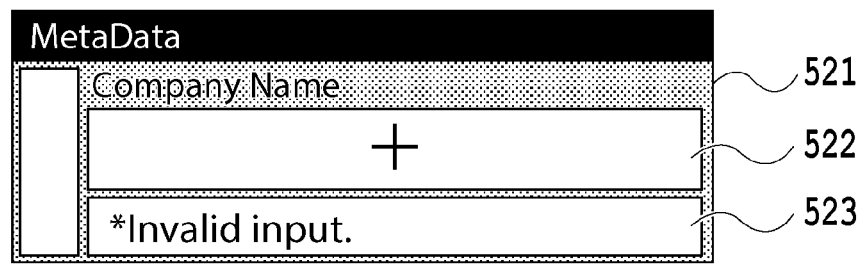

Here, a UI screen example in a case where an OCR area is designated is explained by using diagrams. FIG. 5A and FIG. 5B are diagrams showing a scene in which an OCR area is designated (selected) by the user operation on the UI screen 400 that is provided by the client application 351. FIG. 5A shows a case where the designated OCR area adapts to a verification rule and FIG. 5B shows a case where the designated OCR area does not adapt to a verification rule.

In a case where an OCR area to which a verification rule is set is designated in the preview page image in the state where a setting item is selected, information relating to the designated OCR area is displayed in each area of the selected setting item. In the example in FIG. 5A, in a case where an OCR area 501 on the preview page image 402 is selected in the state where the setting item "Company Name" is displayed as a setting item 511 being selected, control of the UI screen shown below is performed. That is, in a display area 512 corresponding to the setting item 511 being selected, "XYZ Corporation" is displayed., which is the cutout image of the OCR area 501 selected on the preview page image 402. Further, in an input control (input area) 513 corresponding to the setting item 511 being selected, "XYZ Corporation" is displayed, which is text data of the cutout image that is displayed in the display area 512. In a case where the user operation, such as double-click, is performed for the input control 513, the character string that is displayed in the input control 513 enters a state where editing is possible by, for example, an input operation using a keyboard. In a case where the association with the OCR area is not designated yet, a "+" button is displayed.

On the other hand, in a case where an OCR area to which no verification rule is set is designated in the preview page image in the state where a setting item is selected, in the specific area of the selected setting item, information indicating that the input is invalid is displayed. In the example in FIG. 5B, in the state where the setting item "Company Name" is selected and displayed as a setting item 521 being selected, in a case where an OCR area to which the verification rule corresponding to the setting item is not set is selected on the preview page image, display control shown below is performed. That is, in a display area 522 corresponding to the setting item 521 being selected, only "+" is displayed and in an input control 523 corresponding to the setting item 521 being selected, a message "* Invalid input." indicating that the verification rule is not satisfied is displayed.

A unit configured to display a UI screen 500 shown in FIG. 5A and the setting item "Company Name" shown in FIG. 5B may be another arbitrary unit configured to give a notification by a dialog or popup on the UI screen that is provided by the client application 351.

<Control Processing of UI Screen>

Figure 6:
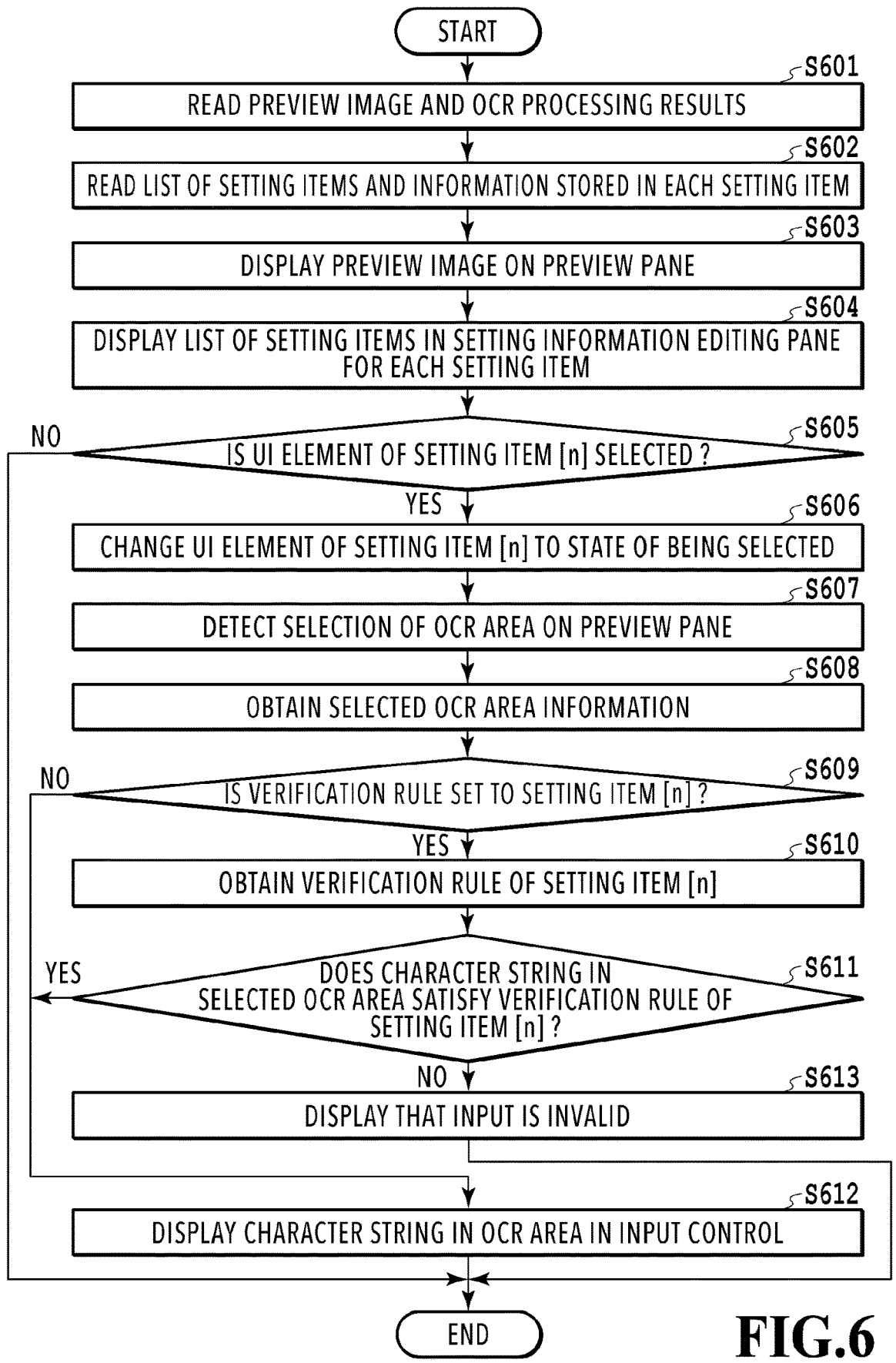
FIG. 6 is a flowchart showing a flow of control processing of a UI screen.

Next, control processing of a UI screen at the time of setting a character string in a selected OCR area as information that is input in a setting item of a file name or metadata using the UI screen that is provided by the client application, which is shown in FIG. 4A and FIG. 4B, and FIG. 5A and FIG. 5B, is explained by using a diagram. FIG. 6 is a flowchart showing a flow of the control processing of a UI screen.

The scanned document processing application 311 obtains a processing-waiting queue from the scanned document job queue 323 and provides the obtained processing-waiting queue to the client application 351. Then, in a case where a user selects a scanned document job for which the user desires to start processing, the scanned document processing application 311 obtains an image file from the scanned document storage unit 322 based on the selected scanned document job. Further, the scanned document processing application 311 obtains the OCR processing results and the business form determination results of the selected scanned document from the scanned document processing results storage unit 325. In addition, the scanned document processing application 311 obtains the list of the setting items for each type of business form and information stored in each setting item from the setting information management unit 324. The scanned document processing application 311 provides the obtained data to the client application 351.

At S601, the client application 351 reads the preview image and the OCR processing results. At S602, the client application 351 reads the list of the setting items and the information stored in each setting item. Then, at S603, the client application 351 displays the preview image on the preview pane. At S604, the client application 351 displays the list of the setting items in the setting information editing pane by the item name for each item.

By performing the processing at S601 to S604 described above, on the display of the user interface 201 of the client terminal 121, the UI screen 400 shown in FIG. 4A is displayed.

At S605, the client application 351 determines whether or not a UI element of a setting item [n] is selected. That is, the client application 351 determines whether or not the user operation, such as click, is performed for the "+" button area of one of the setting items in the setting information editing pane 410 based on the detection results of the click event for the UI element of the setting item [n].

In a case where determination results that the click event for the UI element of the setting item [n] is detected and the user operation, such as click, is performed for the "+" button area of one of the setting items in the setting information editing pane 410 are obtained (YES at S605), the processing is moved to S606. On the other hand, in a case where determination results that the click event for the UI element of the setting item [n] is not detected and the user operation, such as click, is not performed for any setting item in the setting information editing pane 410 are obtained (NO at S605), the flow shown in FIG. 6 is terminated.

At S606, the client application 351 displays the UI element of the setting item [n] for which the click event is detected, that is, the UI element of the setting item [n] selected by the user operation in the state where the UI element is filled in the background color. The filling unit may be a unit configured to change the color of the frame line portion of the UI element or another arbitrary unit. Due to this, it is possible for a user to identify that the user operation to select the UI element of the setting item [n] is received and that the selected UI element of the setting item [n] is set as the processing target.

At S607, the client application 351 detects an OCR area selected by the user operation on the preview page image in the preview pane. Specifically, in the state where the UI element of the setting item [n] is displayed at S606 with the UI element being filled in the background color, in a case where a desired OCR area is selected by the user operation, such as click, from among a plurality of OCR areas on the preview page image in the preview pane, the following processing is performed. That is, the client application 351 detects the click event for the selected OCR area 501.

At S608, the client application 351 obtains OCR area information relating to the OCR area 501 detected at S607. That is, the client application 351 obtains information relating to the starting point coordinates, width, and height of the OCR area 501 and the recognized character string of the OCR results.

At S609, the client application 351 determines whether or not a verification rule is set to the setting item [n] based on the data received from the setting information management unit 324. In a case where determination results that a verification rule is set are obtained (YES at S609), the processing is moved to S610. On the other hand, in a case where determination results that no verification rule is set are obtained (NO at S609), the processing is moved to S612.

At S610, the client application 351 obtains the contents of the verification rule that is set to the setting item [n].

At S611, the client application 351 determines whether or not the character string in the selected OCR area satisfies the verification rule of the setting item [n] obtained at 610. In a case where determination results that the character string in the selected OCR area satisfies the verification rule are obtained (YES at 611), the processing is moved to S612. On the other hand, in a case where determination results that the character string in the selected OCR area does not satisfy the verification rule are obtained (NO at 611), the processing is moved to S613.

At S612, the client application 351 displays the character string extracted from the OCR area 501 selected at S607 in the input control 513 and brings about the state where editing is possible based on the information obtained at S608. In the display area 512, the image that is cut out from the OCR area 501 is displayed.

By performing the processing at S605 to S612 described above, on the display of the user interface 201 of the client terminal 121, the UI screen 500 shown in FIG. 5A is displayed.

At S613, the client application 351 displays the setting item including a message indicating that the input is invalid on the display of the user interface 201 of the client terminal 121. For example, on the display of the user interface 201, as shown in FIG. 5B, a message "* Invalid input." indicating that the verification rule is not satisfied is displayed in the input control 523 corresponding to the setting item 521 being selected. By the message such as this being displayed, the user is notified of the determination results relating to the contents of the user operation.

<Setting Method of Verification Rule>

Figure 7:
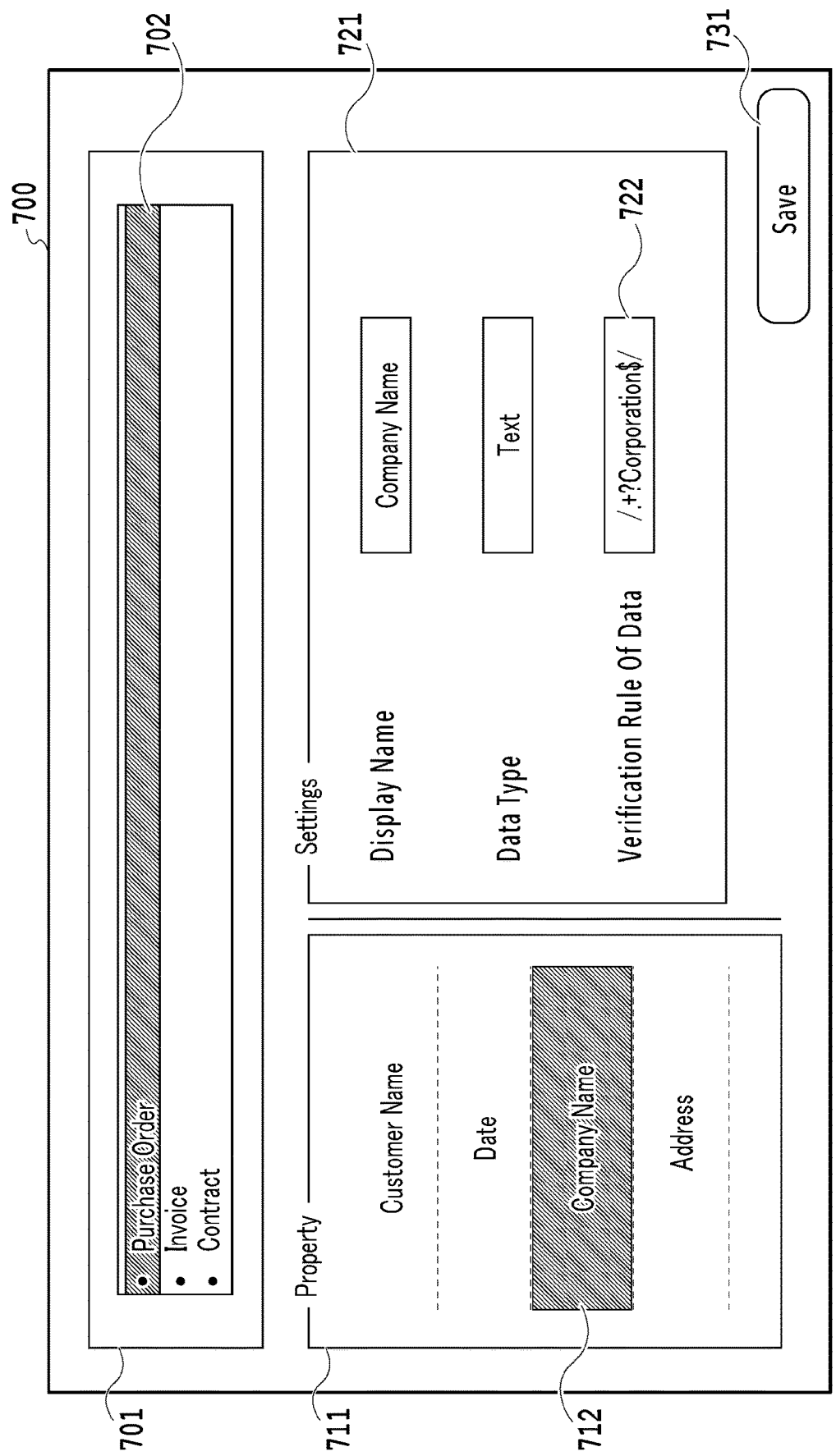
FIG. 7 is a diagram explaining a setting example of a verification rule.

A method of setting a verification rule to each scanned document (type of business form) is explained by using a diagram. FIG. 7 is a diagram explaining a UI screen example on which to set a verification rule to each scanned document (type of business form). A UI screen (in the following, also referred to as a setting UI) 700 may be a UI screen that is provided as a setting function of the client application 351.

Alternatively, the UI screen 700 may be a UI screen that is provided by an independent application installed in the client terminal 121 and different from the client application 351.

The UI screen 700 has three areas: a registered document display area 701, a setting item display area 711, and a detailed information display area 721. The registered document display area 701 is an area in which a list of types of document registered in the scanned document processing results storage unit 325 is displayed. FIG. 7 shows an example in which three types of document (business form), that is, "Purchase Order", "Invoice", and "Contract" are registered and a registered document "Purchase Order" 702 is selected by the user operation.

The setting item display area 711 is an area in which a list of setting items registered in association with the selected registered document "Purchase Order" 702 is displayed. FIG. 7 shows an example in which four setting items, that is, "Customer Name", "Date", "Company Name", and "Address" are registered and a registered setting item "Company Name" 712 is selected by the user operation.

The detailed information display area 721 is an area in which a list of setting information details that are set in association with the selected setting item is displayed. FIG. 7 shows an example in which in association with the selected setting item "Company Name" 712, "Company Name" is set as the display name, and "Text" is set as the data type. Further, in FIG. 7, "/.+?Corporation$/" is set as the verification rule of data. A verification rule input field 722 in which "/.+?Corporation$/" is displayed is a field in which an arbitrary verification rule is input by the user operation. In a case where the user operation, such as click, with a Save button 731 is detected in the state where the verification rule is input in the verification rule input field, the relevant setting item is reflected in the business form for which the verification rule that is input in the verification rule input field 722 is selected. As the input method of a verification rule, it may also be possible to directly input an arbitrary rule in the verification rule input field 722 by the user operation as shown in FIG. 7. Further, as the input method of a verification rule, it may also be possible to display verification rule candidates prepared in advance in a pulldown list and select from the pulldown list by the user operation.

<Setting Processing of Verification Rule>

Figure 8:
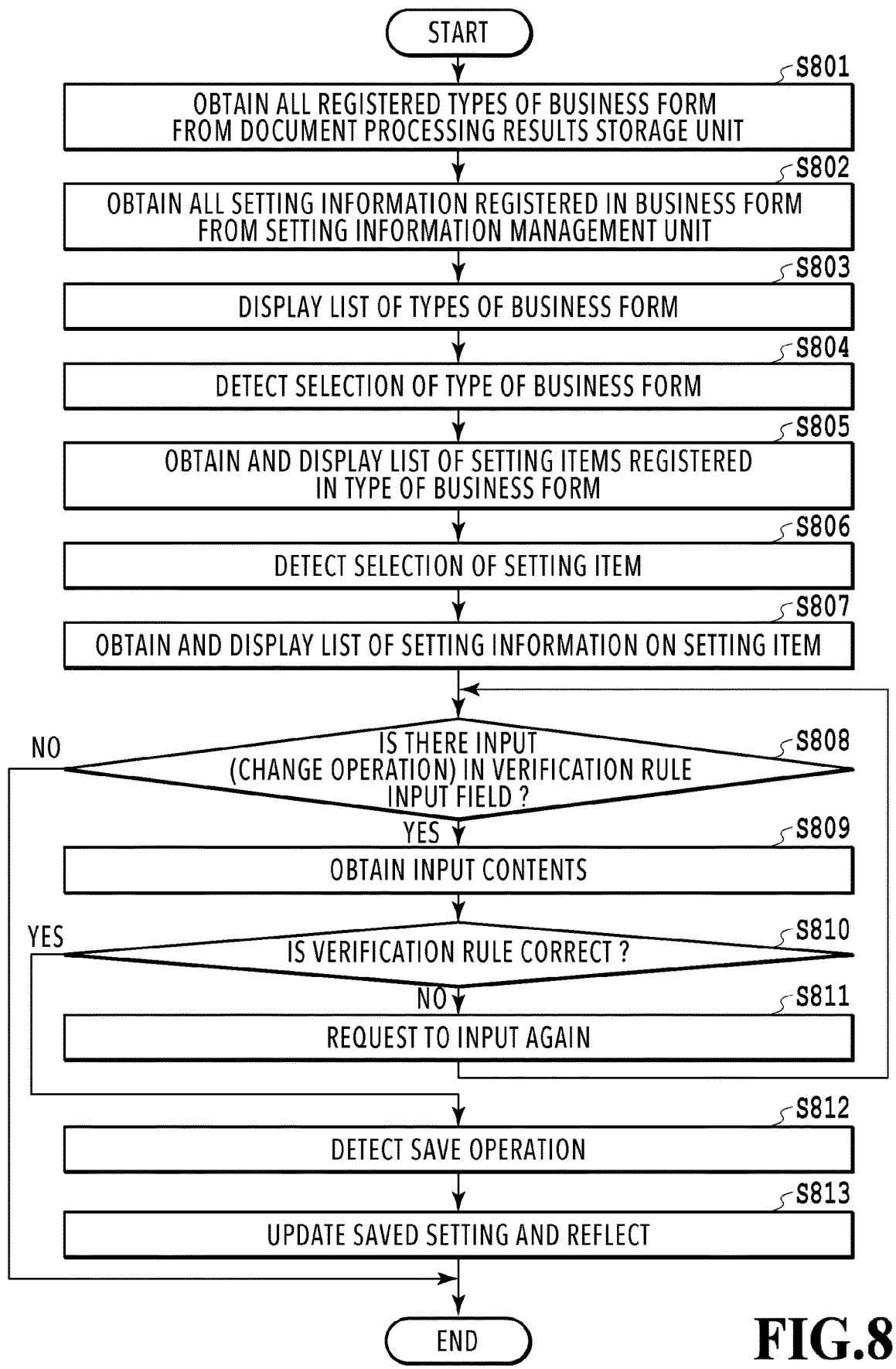
FIG. 8 is a flowchart showing a flow of setting processing of a verification rule.

Processing to set a verification rule to each scanned document (type of business form) is explained by using a diagram. FIG. 8 is a flowchart showing a flow of processing to set a verification rule to each scanned document (type of business form).

At S801, the setting UI obtains the type of business form from the scanned document processing results storage unit 325.

Following the above, at S802, the setting UI obtains setting information in association with the type of business form from the setting information management unit 324. At S803, the setting UI creates a list of types of document registered in the scanned document processing results storage unit 325 and displays the list to a user.

At S804, the setting UI detects the selection operation of the type of business form by a user. The selection operation of the type of business form is an operation by a user to select a document to which the user desires to set a verification rule from among the displayed types of document.

At S805, the setting UI obtains a list of setting items registered in the selected type of business form and displays the obtained list of setting items.

At S806, the setting UI detects the selection operation of a setting item by a user. The selection operation of a setting item is an operation by a user to select an arbitrary item from among the displayed setting items.

At S807, the setting UI obtains a list of setting information on the selected setting item and displays the obtained list of setting information on the setting item.

At S808, the setting UI determines whether or not input (change operation) by a user is performed for the verification rule input field. In a case where determination results that input (change operation) is performed for the verification rule input field are obtained (YES at S808), the processing is moved to S809. On the other hand, in a case where determination results that input (change operation) is not performed for the verification rule input field are obtained (NO at S808), the flow shown in FIG. 8 is terminated.

At S809, the setting UI obtains the contents that are input in the verification rule input field. The verification rule may be any rule to perform verification about the input contents, such as the regular expression, the limitation by character code, the upper limit of the number of characters, and whether or not an arbitrary character is included.

In order to simplify explanation, explanation is given by using an example in which verification is performed by setting a rule of the regular expression. In the verification rule input field 722, the verification rule is set that only a character string, such as "/.+?Corporation$/", can be input, which includes one or more characters at the top of the character string and whose end is "Corporation". Further, it is possible to check whether or not the set regular expression is satisfied by checking whether or not the character string that can be extracted as a result of applying the regular expression to the character string in the obtained OCR area matches with the character string in the OCR area.

At S810, the setting UI determines whether or not a correct verification rule is input in the verification rule input field as described above. In a case where determination results that the verification rule is not input in a correct format are obtained (NO at S810), the processing is moved to S811. On the other hand, in a case where determination results that the verification rule is input in a correct format are obtained (YES at S810), the processing is moved to S812.

At S811, the setting UI requests a user to input the verification rule again in the verification rule input field. For example, processing to display or the like a message prompting a user to input the verification rule again in the verification rule input field is performed.

At S812, the setting UI detects the save operation by a user.

At S813, the setting UI sends the setting information changed at the time of save to the setting information management unit 324, reflects the changed setting information in the corresponding setting information, and updates the registered setting information.

By the above processing being performed, the verification rule is set to the setting item.

<Configuration Example of UI Screen to which Verification Rule is Applied>

Figure 9:
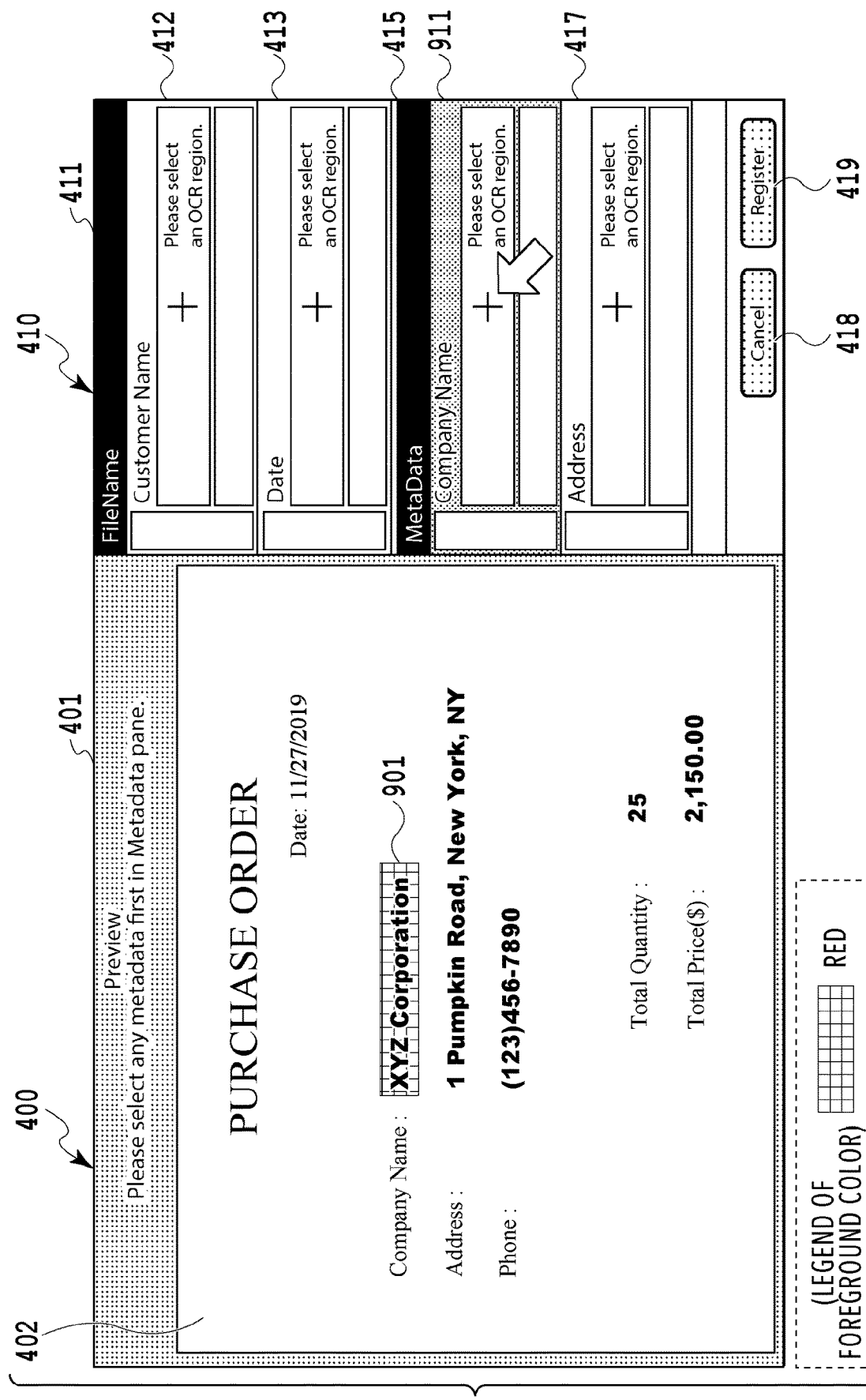
FIG. 9 is a diagram showing an example of a UI screen that is provided by the client application.

A configuration example of a UI screen to which a verification rule is applied is explained by using a diagram. FIG. 9 is a diagram explaining a scene in which a setting item of metadata in accordance with a verification rule is selected on the UI screen that is provided by the client application 351.

By the processing so far, the control processing of the UI screen at the time of setting the verification rule and setting the character string in the OCR area in the preview page image in the setting item to which the verification rule is set is explained. Note that in this case, it is necessary for a user to find at which place in the preview page image in the preview pane the character string valid for the item to which the verification rule is set exists from the entire preview page image, and therefore, time and effort will be required for the setting operation.

Consequently, in the present embodiment, it is made possible to easily present an OCR area that can be input before the user operation is performed by highlighting the OCR area that satisfies the verification rule that is set to the setting item.

In the preview page image 402 that is displayed in the preview pane 401, display control is performed by which a highlighted portion 901 whose foreground becomes red is displayed in the OCR area that satisfies the verification rule in an overlapping manner. Further, for the setting information 415 relating to "MetaData" in the setting information editing pane 410, display control is performed by which at the frame line portion of the target setting item "Company Name", a highlighted portion 911 whose color is red or the like that is the same as the color of the highlighted portion 901 is displayed in an overlapping manner. Although the case is explained where both the highlighted portion 901 and the highlighted portion 911 are red, the color of the highlighted portion 901 and the highlighted portion 911 is not limited to red and the color of the highlighted portion 901 may be different from that of the highlighted portion 911 and any color can be used as long as it is possible to notify a user of the target place. By performing the display control to display the highlighted portion 901 and the highlighted portion 911 in an overlapping manner as described above, in a case where a setting item is selected by the user operation, it is made possible to notify the user of the OCR area that corresponds to the setting item and satisfies the verification rule.

<Highlighting Processing>

Figure 10:
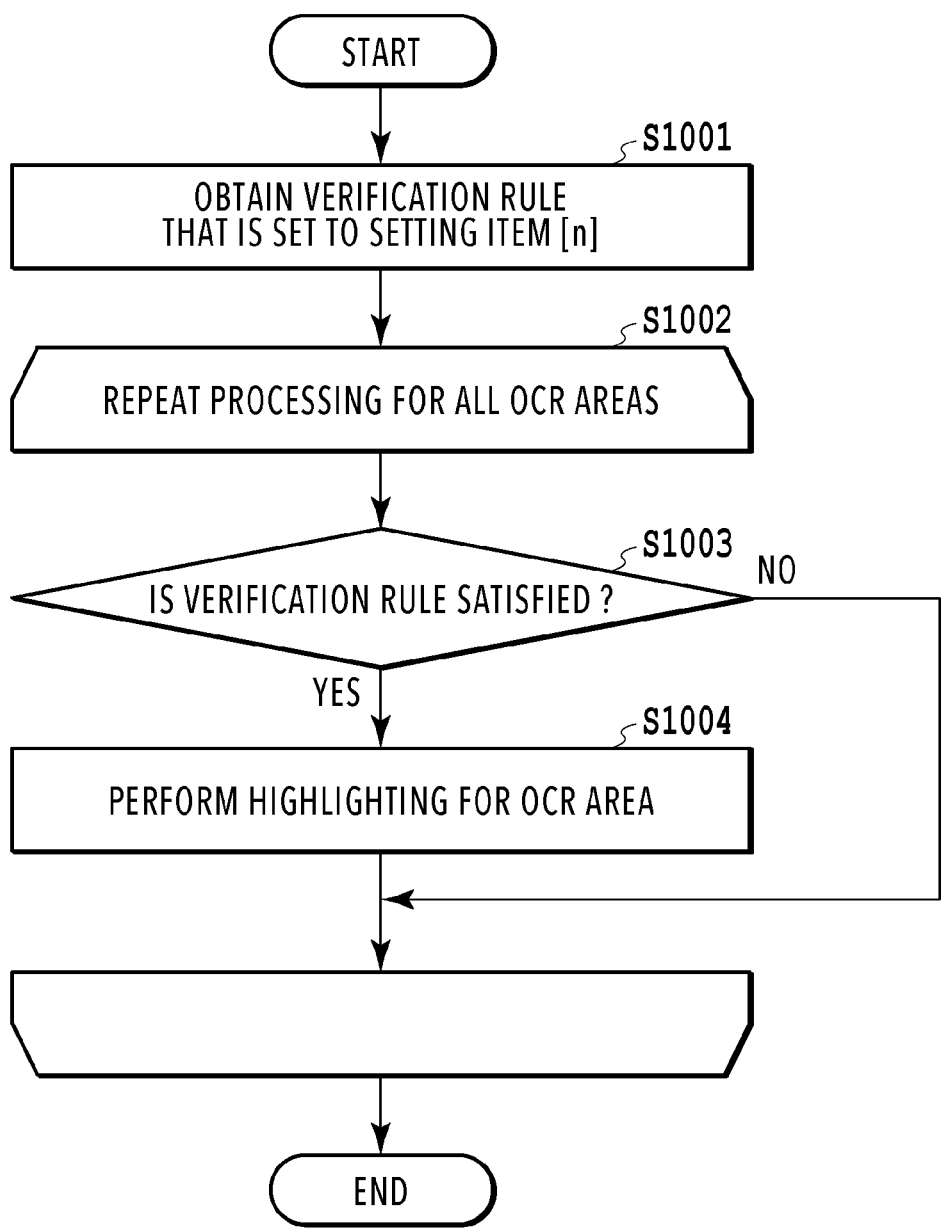
FIG. 10 is a flowchart showing a flow of control processing of a UI screen.

Here, a flow of processing to perform highlighting for an OCR area that satisfies a verification rule is explained by using a diagram. FIG. 10 is a flowchart showing a flow of highlighting processing. It is assumed that a setting item [n] to which an arbitrary verification rule is set by a user is selected. That is, it is assumed that the setting of a verification rule explained by using FIG. 8 and the processing up to the selection of an arbitrary setting item [n] (606) shown in FIG. 6 have been completed.

At S1001, the client application 351 obtains the verification rule that is set to the selected setting item [n].

At S1002, processing at S1003 and S1004 is performed repeatedly for all the OCR areas.

That is, a processing-target OCR area is selected from among unprocessed OCR areas and processing at S1003 and S1004 is performed for the selected OCR area. In a case where processing for the processing-target OCR area is completed, a processing-target OCR area is selected again from among unprocessed OCR areas. In a case where there is no unprocessed OCR area, the flow shown in FIG. 10 is terminated.

At S1003, the client application 351 determines (checks) whether or not the extracted character string in the processing-target OCR area satisfies the verification rule. In a case where determination results that the verification rule is satisfied are obtained (YES at S1003), the processing is moved to S1004. In a case where determination results that the verification rule is not satisfied are obtained (NO at S1003), S1004 is skipped and the processing for the processing-target OCR is terminated. Because of this, highlighting is not performed for the processing-target OCR area.

At S1004, processing to perform highlighting for the processing-target OCR area is performed. That is, for the OCR area that satisfies the verification rule, displaying to change the foreground color is performed. The unit configured to perform highlighting is not limited to a unit configured to change the foreground color and, for example, may be another unit, such as a unit configured to change the frame line surrounding the OCR area.

Here, the flow shown in FIG. 10 is explained by using the scanned image example shown in FIG. 9.

It is assumed that the rule to verify whether the character string of "○○ Corporation" (○○ are arbitrary characters) is the regular expression, such as "/.+?Corporation$/", is set to the setting item of "Company Name" in FIG. 9. As the OCR area that satisfies this verification rule, the area in which "XYZ Corporation" exists is specified. Then, for "XYZ Corporation", highlighting is performed and the display control is performed by which the foreground color of the OCR area including "XYZ Corporation" is displayed in red as the highlighted portion 901, The foreground color at the time of performing highlighting is not limited to red. It is only required for the color to be different from the color of the extracted character string in the OCR area and the background color on the periphery and to be capable of notifying a user of the OCR area.

Figures 11A, 11B, 11C:
FIG. 11A to FIG. 11C are each a diagram showing an example of highlighting of a selectable OCR area.

Here, another example of the above-described highlighted portion is explained by using diagrams. FIG. 11A to FIG. 11C are each a diagram showing another example of the highlighted portion shown in FIG. 9.

As a highlighted portion, as shown in FIG. 11A, it may also be possible to use a balloon 1101 that is a display to be displayed in an overlapping manner adjacent to an OCR area that satisfies the verification rule on the upper side of the OCR area and in which it is possible to input (set) text and the like in the preview page image 402. Further, it may also be possible to add a message indicating that it is possible to obtain a character string that satisfies the verification rule from the target OCR area, such as "○ Input is possible", to the text that is displayed within the balloon 1101. Furthermore, it may also be possible to use a tooltip in place of the balloon 1101.

Further, as a highlighted portion, as shown in FIG. 11B, it may also be possible to use an icon 1102 that is displayed in an overlapping manner at the place at which an OCR area that satisfies the verification rule existed before the highlighting processing and from which the OCR area was moved downward in the preview page image 402. The icon 1102 may be a figure (mark) of a double circle or a figure in another shape.

Furthermore, as a highlighted portion, as shown in FIG. 11C, it may also be possible to make the color of the area other than an OCR area that satisfies the verification rule (other than the character recognition area) different from white by graying out the area and the like in the preview page image 402. That is, it may also be possible to display a rectangular area 1103 in color different from the color of the area other than the rectangular area 1103.

Even in a case where the character string in the selected OCR area does not satisfy the verification rule at S611 in FIG. 6, it may also be possible to display the highlighted portion shown in FIG. 11A to FIG. 11C in an overlapping manner in the preview page image 402 at the time of detecting the selection operation, such as hover and click, in the OCR area that can be input.

On the other hand, it may also be possible to display a highlighted portion in an overlapping manner, which indicates that selection is not possible, in the preview page image 402 at the time of detecting the selection operation, such as hover and click, in the OCR area that cannot be selected.

Figure 12A:
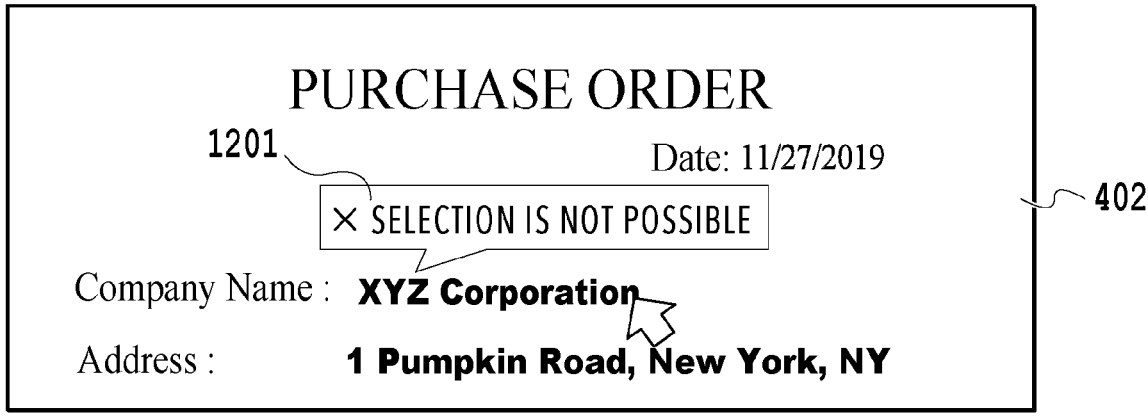
FIG. 12A and FIG. 12B are each a diagram showing an example of highlighting of an unselectable OCR area.
Figure 12B:

An example is explained by using diagrams, in which in a case where the selection operation for a character recognition area different from a character recognition area that can be selected is detected, a character string that cannot be selected is highlighted, which is the character recognition area corresponding to the operation. FIG. 12A and FIG. 12B are each a diagram showing an example of highlighting of a character string that cannot be selected (cannot be set).

As a highlighted portion indicating that selection is not possible, as shown in FIG. 12A, it may also be possible to use a balloon 1201 that is a display to be displayed in an overlapping manner adjacent to an OCR area that does not satisfy the verification rule on the upper side of the OCR area and in which it is not possible to input text or the like in the preview page image 402. Further, it may also be possible to add a message indicating that it is not possible to obtain a character string that does not satisfy the verification rule from the target OCR area, such as "× Input is not possible", to the text that is displayed within the balloon 1201. Furthermore, it may also be possible to use a tooltip in place of the balloon 1201.

Further, as a highlighted portion indicating that selection is not possible, as shown in FIG. 12B, it may also be possible to use an icon 1202 that is displayed in an overlapping manner at the place at which an OCR area that does not satisfy the verification rule existed before the highlighting processing and from which the OCR area was moved downward in the preview page image 402. The icon 1202 may be a figure of x ("wrong" mark) or a figure in another shape.

As explained above, it is made possible to present an OCR area to a user in an easy-to-see manner, which can be input in a setting item to which a verification rule is set. Further, it is made possible to present an OCR area to a user in an easy-to-see manner, which cannot be input in a setting item to which a verification rule is set and which cannot be selected.

Figure 13:
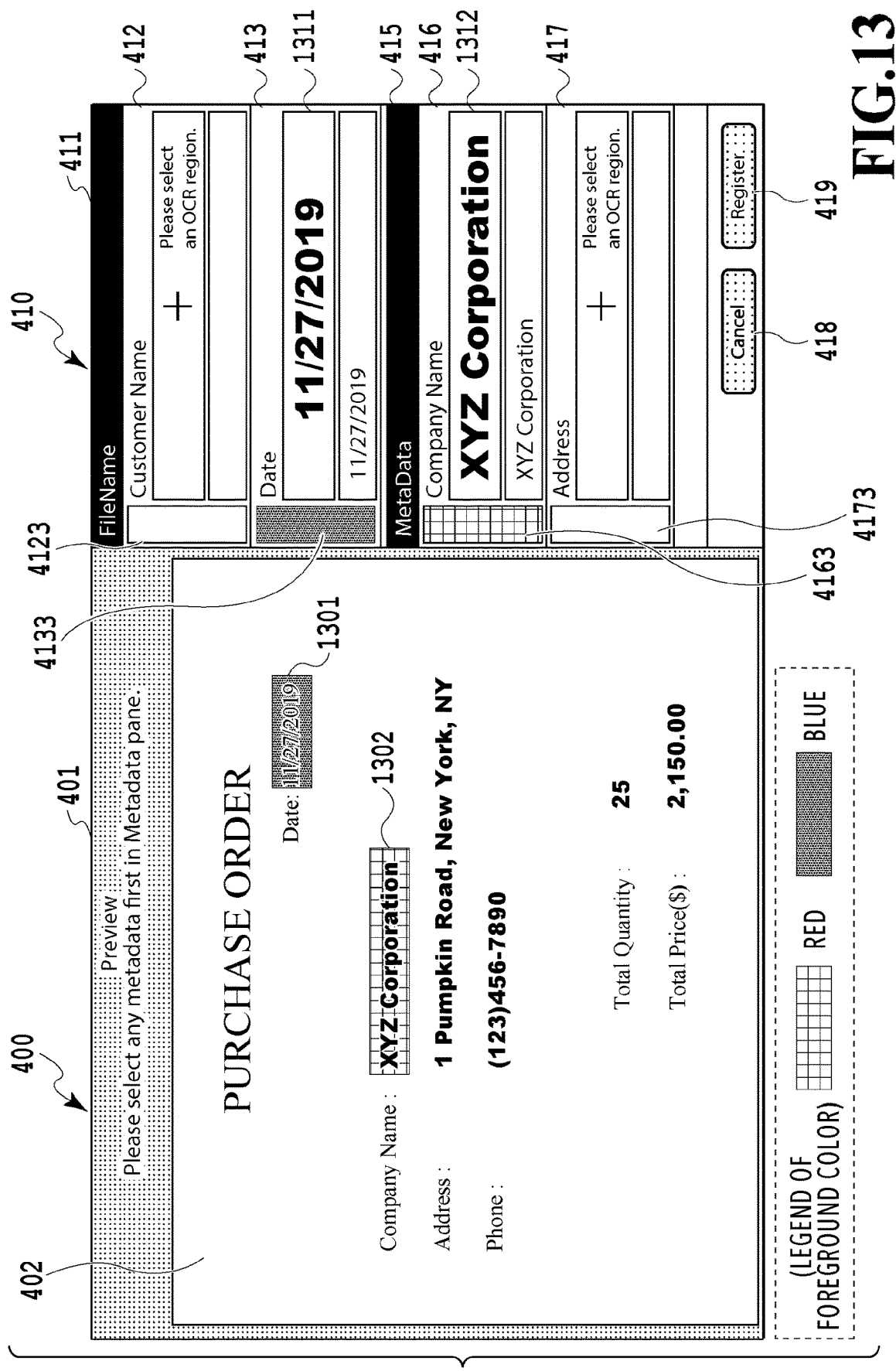
FIG. 13 is a diagram showing an example of a UI screen that is provided by the client application.

FIG. 13 is a diagram showing an example of a UI screen that is displayed at the time of processing a scanned image including an OCR area that satisfies a regular expression and which is determined uniquely. In a case where an OCR area that satisfies a regular expression and which is determined uniquely exists in the preview page image 402, in the area including the OCR area, a display portion that performs highlighting is displayed in an overlapping manner and the character string corresponding to the setting item in the corresponding setting information editing pane is displayed. Further, in the setting information editing pane, the same color as that of the corresponding display portion is displayed. In FIG. 13, on "Nov. 27, 2019" in the OCR area corresponding to "Date:" in the preview page image 402, a highlighted portion 1301 is displayed and on "XYZ Corporation" in the OCR area corresponding to "Company Name:", a highlighted portion 1302 is displayed. In the highlighted portion 1301, the blue foreground is displayed in an overlapping in the OCR area and in the highlighted portion 1302, the red foreground is displayed in an overlapping manner in the OCR area. Further, in the setting information editing pane 410, in the setting item corresponding to the highlighted portion in the preview pane 401, the corresponding information is displayed automatically.

That is, as regards the setting item "Date", in the display area, the image of "Nov. 27, 2019" is displayed automatically, in the input control, the text data of "Nov. 27, 2019" is displayed automatically, and in the foreground color display portion, the blue the same color as that of the highlighted portion 1301 is displayed automatically. As regards the setting item "Company Name", in the display area, the image of "XYZ Corporation" is displayed, in the input control, the text data of "XYZ Corporation" is displayed, and in the foreground color display portion, the red the same color as that of the highlighted portion 1302 is displayed.

<Control Processing of UI Screen>

Figure 14:
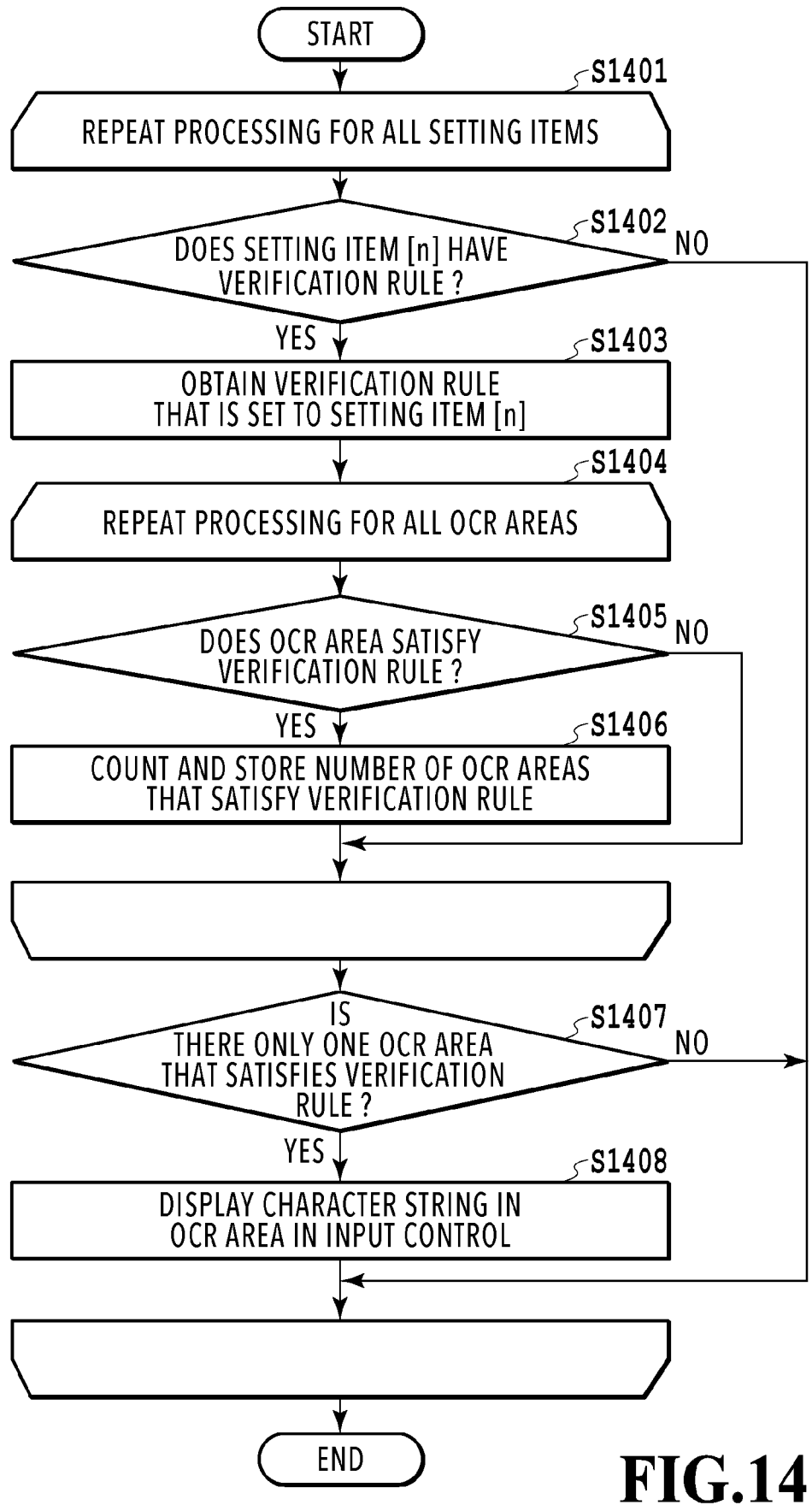
FIG. 14 is a flowchart showing a flow of control processing of a UI screen.

Here, a flow of control processing of a UI screen at the time of automatically setting a character string in an OCR area that satisfies a regular expression and which is determined uniquely in a setting item is explained by using a diagram. FIG. 14 is a flowchart showing a flow of control processing of a UI screen.

It is assumed that the setting of an arbitrary verification rule to an arbitrary setting item by a user, the extraction of an OCR area, the displaying of a preview image in the preview pane, and the displaying of a list of setting items in the setting information editing pane have been completed. That is, it is assumed that the setting of a verification rule explained by using FIG. 8 and the processing up to the displaying of each setting item (S604) in FIG. 6 have been completed.

At S1401, the client application 351 performs the processing at S1402 to S1408 repeatedly for all the setting items. That is, a processing-target setting item is selected from among unprocessed setting items and for the selected setting item, the processing at S1402 to S1408 is performed. In a case where the processing for the processing-target setting item is completed, a processing-target setting item is selected again from among unprocessed setting items. In a case where there is no unprocessed setting item, the flow shown in FIG. 14 is terminated.

At S1402, the client application 351 determines (checks) whether or not a verification rule is set to the selected setting item. In a case where determination results that the selected setting item does not have a verification rule and no verification rule is set to the selected setting item are obtained (NO at S1402), the processing is moved to the processing of the next setting item. In a case where determination results that the selected setting item has a verification rule and a verification rule is set to the selected setting item are obtained (YES at S1402), the processing is moved to S1403.

At S1403, the client application 351 obtains the verification rule that is set to the selected setting item.

At S1404, the processing at S1405 to S1406 is performed repeatedly for all the OCR areas.

That is, a processing-target OCR area is selected from among unprocessed OCR areas and for the selected OCR area, the processing at S1405 to S1406 is performed. In a case where the processing for the processing-target OCR area is completed, a processing-target OCR area is selected again from among unprocessed OCR areas. In a case where there is no unprocessed OCR area, the processing is moved to S1407.

At S1405, for the OCR area selected at S1404, whether or not an OCR that satisfies the obtained verification rule exists is determined (checked). In a case where determination results that an OCR area that satisfies the obtained verification rule does not exist are obtained (NO at S1405), S1406 is skipped. Then, the processing is returned to S1404 and at S1404, an unprocessed OCR area is selected as a processing target. On the other hand, in a case where determination results that an OCR area that satisfies the obtained verification rule exists are obtained (YES at S1405), the processing is moved to S1406.

At S1406, the selected OCR area is stored and the number of OCR areas that satisfy the verification rule is counted.

In a case where the check of whether or not the verification rule is satisfied is completed for all the OCR areas, the processing is moved to S1407.

At S1407, whether or not there is only one OCR area that satisfies the verification rule is determined. In a case where determination results that there is only one OCR area that satisfies the verification rule are obtained (YES at S1407), the processing is moved to S1408. On the other hand, in a case where determination results that there are two or more OCR areas that satisfy the verification rule are obtained (NO at S1407), S1408 is skipped.

In a case where there is an unprocessed setting item, the processing is returned to S1401.

At S1408, the client application 351 displays the character string in the OCR area that satisfies the verification rule in the input control.

The above-described processing is performed for all the setting items.

Here, an example of a UI screen in a case where the flow shown in FIG. 14 is applied is explained by using FIG. 13. It is assumed that the rule to verify whether the character string in the form of "□□/□□/□□□□" (□ is an arbitrary character of 0 to 9) is the regular expression, such as "/¥d{2}¥/(¥d{2})¥/(¥d{4})$/", is set to a display area 1311 of the setting item of "Date" 413. It is assumed that the rule to verify whether the character string in the form of "○○ Corporation" (○○ are arbitrary characters) is the regular expression, such as "/.+?Corporation$/", is set to a display area 1312 of the setting item of "Company Name" 416. It is assumed that no verification rule is set to the other setting items.

At this time, as regards "FileName", first, whether a verification rule is set to the setting item "Customer Name" 412 is checked and no verification rule is set to this setting item, and therefore, the processing moves to processing of the next setting item "Date" 413. To the setting item "Date" 413, the above-described verification rule is set, and therefore, processing to extract an OCR area that satisfies this verification rule from all the OCR areas is performed. The OCR area that satisfies this verification rule among all the OCR areas is only one, that is, "Nov. 27, 2019" in the OCR area to which the highlighted portion 1301 is added, and therefore, the OCR area is automatically set to the display area 1311 of the setting item "Date" 413. That is, in the display area 1311, the cutout image of the OCR area is input automatically. Further, in the input control of "Date" 413, "Nov. 27, 2019", which is the character string extracted from the OCR area, is input automatically.

Next, as regards "MetaData", the processing moves to processing of the setting item "Company Name" 416. To the setting item "Company Name" 416, the above-described verification rule is set, and therefore, among all the OCR areas, the OCR area that satisfies this verification rule is extracted. Among all the OCR areas, the OCR area that satisfies this verification rule is only one, that is, "XYZ Corporation" in the OCR area to which the highlighted portion 1302 is added, and therefore, the OCR area is automatically set to the display area 1312 of the setting item "Company Name". That is, in the display area 1312, the cutout image of the OCR area is input automatically. Further, in the input control of "Company Name" 416, "XYZ Corporation", which is the character string extracted from the OCR area, is input automatically.

Lastly, the processing moves to processing of the setting item "Address" 417. Whether a verification rule is set to the setting item "Address" 417 is checked and no verification rule is set to this setting item, and therefore, the check is completed for all the setting items and the processing terminates.

By the processing being performed as described above, the UI screen in the state shown in FIG. 13 is displayed, and therefore, it is made easier to present an OCR area in association with a verification rule of a setting item to a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to present a character recognition area, which is a designation target, to a user in an easy-to-see manner.

This application claims the benefit of Japanese Patent Application No. 2021-037164, filed Mar. 9, 2021, which is hereby incorporated by reference herein in its entirety.

What is claimed is:

1. An information processing apparatus comprising:
at least one memory storing a program; and
at least one processor that executes the program to:
obtain results of character recognition processing for a scanned image of a document and a plurality of setting items that are to be set to a property of the scanned image;
control a display to display a screen including:
a preview area where the scanned image is displayed; and an editing area where the plurality of setting items are displayed, and where information is input and edited for each of the plurality of setting items;

detect a selection for one setting item among the plurality of setting items displayed in the editing area;

obtain a verification rule that is set to the selected one setting item; and highlight, on the scanned image displayed in the preview area of the screen, a character recognition area corresponding to one of the results of the character recognition processing that satisfies the obtained verification rule, in a state where the selection for the one setting item is detected.

2. The information processing apparatus according to claim 1, wherein the processor controls the display to display a message or a mark adjacent to the character recognition area on the scanned image displayed in the preview area of the screen for highlighting the character recognition area corresponding to the one of the results of the character recognition processing that satisfies the obtained verification rule, in the state where the selection for the one setting item is detected.

3. The information processing apparatus according to claim 1, wherein the processor controls the display to display, in a state where an operation for a character recognition area corresponding to a result of the character recognition processing does not satisfy the obtained verification rule, a message or a mark indicating that the result of the character recognition processing of the operated character recognition area cannot be input in the selected one setting item.

4. The information processing apparatus according to claim 1, wherein the processor permits, in a state where only one character recognition area satisfies the obtained verification rule, inputting of a character string corresponding to the only one character recognition area in the editing area.

5. The information processing apparatus according to claim 1, wherein the processor highlights the character recognition area corresponding to the one of the results of the character recognition processing that satisfies the obtained verification rule by attaching a color to a foreground of the character recognition area.

6. The information processing apparatus according to claim 5, wherein the screen includes a foreground color display portion that displays a color attached to the foreground of the character recognition area.

7. The information processing apparatus according to claim 1, wherein the property includes a file name of the scanned image and metadata of the scanned image.

8. An information processing method comprising:
obtaining results of character recognition processing for a scanned image of a document and a plurality of setting items that are to be set to a property of the scanned image;

controlling a display to display a screen including:
a preview area where the scanned image is displayed; and an editing area where the plurality of setting items are displayed, and information is input and edited for each of the plurality of setting items;

detecting a selection for one setting item among the plurality of setting items displayed in the editing area;

obtaining a verification rule that is set to the selected one setting item; and highlighting, on the scanned image displayed in the preview area of the screen, a character recognition area corresponding to one of the results of the character recognition processing that satisfies the obtained verification rule, in a state where the selection for the one setting item is detected.

9. A non-transitory computer readable storage medium storing a program executable by a computer to execute a method comprising:
obtaining results of character recognition processing for a scanned image of a document and a plurality of setting items that are to be set to a property of the scanned image;

controlling a display to display a screen including:
a preview area where the scanned image is displayed; and an editing area where the plurality of setting items are displayed, and where information is input and edited for each of the plurality of setting items;

detecting a selection for one setting item among the plurality of setting items displayed in the editing area;

obtaining a verification rule that is set to the selected one setting item; and highlighting, on the scanned image displayed in the preview area of the screen, a character recognition area corresponding to one of the results of the character recognition processing that satisfies the obtained verification rule, in a state where the selection for the one setting item is detected.

\* \* \* \* \*